United States Patent [19]
Sato et al.

[11] Patent Number: 5,835,313
[45] Date of Patent: Nov. 10, 1998

[54] COMBINATION READ/WRITE THIN FILM MAGNETIC HEAD

[75] Inventors: Kiyoshi Sato; Kenji Honda, both of Niigata-ken, Japan

[73] Assignee: Alps Electric Co., Ltd., Tokyo, Japan

[21] Appl. No.: 915,368

[22] Filed: Aug. 20, 1997

[51] Int. Cl.[6] .............................. G11B 5/127; G11B 5/33
[52] U.S. Cl. ........................................................ 360/113
[58] Field of Search ............................ 360/113, 125–127

[56] References Cited

U.S. PATENT DOCUMENTS

| | | | |
|---|---|---|---|
| 5,272,582 | 12/1993 | Shibata et al. | 360/126 X |
| 5,291,363 | 3/1994 | Somers | 360/113 |
| 5,300,062 | 4/1994 | Matsuzawa et al. | 360/126 |
| 5,371,643 | 12/1994 | Yuito et al. | 360/113 |
| 5,465,186 | 11/1995 | Bajorek et al. | 360/113 |
| 5,504,643 | 4/1996 | Lazzari | 360/113 |
| 5,691,867 | 11/1997 | Onuma et al. | 360/126 |
| 5,701,221 | 12/1997 | Taniyama et al. | 360/113 |

*Primary Examiner*—John H. Wolff
*Attorney, Agent, or Firm*—Brinks Hofer Gilson & Lione

[57] ABSTRACT

A combination read/write thin film magnetic head comprises: a magnetoresistive element, a main lead layer leading a sensing current to the magnetoresistive element, a lower-core layer formed on the main lead layer through an insulating layer, an upper-core layer facing the lower-core layer through a magnetic gap at the section facing a recording medium, a coil layer inducing a magnetic field to both of the lower- and upper-core layers, and a coil extraction layer simultaneously formed of the same material in the same step as the main lead layer, wherein the coil extraction layer is connected to the wound center of the coil layer.

6 Claims, 4 Drawing Sheets

COMBINATION READ/WRITE THIN FILM
MAGNETIC HEAD

BACKGROUND OF THE INVENTION

1. Field of the Invention

The present invention relates to combination read/write thin film magnetic heads used in floating-type magnetic heads and the like. In particular, the present invention relates to a combination read/write thin film magnetic head, in which an inductive-type writing head is deposited on a reading head which uses the magnetoresistance effect.

2. Description of the Related Art

FIG. 3 is an enlarged cross-sectional view of a conventional combination read/write thin film magnetic head. The magnetic head includes a reading head h1 which uses the magnetoresistance effect provided beside the trailing side face of a slider as a component of a floating head and an inductive head h2 for writing deposited thereon.

The reading head h1 includes a lower-shielding layer 1 formed of a magnetic material having high magnetic permeability, such as sendust or permalloy, a lower-gap layer 2 formed thereon and composed of $Al_2O_3$ or the like, and a magnetoresistive element 3 formed thereon. The magnetoresistive element 3 is composed, from the bottom, of three layers, i.e., a soft magnetic layer or soft adjacent layer (SAL), a nonmagnetic layer or SHUNT layer, and a magnetoresistive layer or MR layer. In general, the magnetoresistive layer is formed of a Fe-Ni alloy (permalloy), the nonmagnetic layer is formed of tantalum (Ta), and the soft magnetic layer is formed of a Ni-Fe-Nb alloy.

A hard bias layer 4 is provided as a longitudinal bias layer beside both sides of the magnetoresistive element 3. A main lead layer 5 composed of a nonmagnetic electrically conductive material having low electrical resistance, e.g. copper (Cu) or tungsten (W), is formed over the hard bias layer 4 and the lower-gap layer 2. An upper-gap layer 7 composed of aluminum oxide ($Al_2O_3$) etc. is formed thereon.

A lower-core layer 8 composed of permalloy etc. is deposited on the upper-gap layer 7 by plating or the like. In the inductive head h2, the lower-core layer 8 acts as a core for conducting a recording magnetic field to a recording medium, whereas in the reading head h1, the lower-core layer 8 acts as an upper-shielding layer.

A gap layer (nonmagnetic material layer) 10 composed of aluminum oxide ($Al_2O_3$) or the like and an insulating layer 11 formed of polyimide or a resist material are deposited on the lower-core layer 8, and a coil layer 12 spirally formed by patterning is formed on the insulating layer 11. The coil layer 12 is formed of a nonmagnetic electrically conductive material having low electric resistance, e.g. copper (Cu), and is surrounded with an insulating layer 14 formed of polyimide or a resist material. An upper-core layer 15 composed of a magnetic material such as permalloy is provided on the insulating layer 14.

The front end 15a of the upper-core layer 15 faces the lower-core layer 8 through the gap layer 10 to form a magnetic gap layer having a gap length G1 which conducts a recording magnetic field on a recording medium, and the base end 15b is magnetically connected to the lower-core layer 8.

FIG. 4 is a plan view illustrating the formation of coil lead layers which conduct a recording current flow into the coil layer 12. As shown in FIGS. 3 and 4, a first coil lead layer 18 is formed on the insulating layer 14 so as to cross the coil layer 12, and the front end 18a of the first coil lead layer 18 is bumped into a hole formed on the insulating layer 14 and is electrically connected to the wound center 12a of the coil layer 12. A second coil lead layer 19 is also bumped into another hole on the insulating layer 14 and is electrically connected to the outer terminal 12b of the coil layer 12.

The first and second coil lead layers 18 and 19 are formed of the same material as the upper-core layer 15, and these three layers 18, 19 and 15 are simultaneously formed by plating.

The inductive head h2 for writing is composed of the layers from the lower-core layer 8 to the upper-core layer 15. In the inductive head h2, a recording current flow is conducted to the coil layer 12 through the first and second coil lead layers 18 and 19, and a recording magnetic field is induced in the upper- and lower- core layers 15 and 8 through the coil layer 12. Magnetic signals are recorded on a recording medium such as a hard disk by means of a fringing magnetic field from the lower-core layer 8 and the front end 15a of the upper-core layer at the magnetic gap length G1.

In the conventional combination read/write thin film magnetic head shown in FIGS. 3 and 4, the coil layer 12 is formed of a material having a low electrical resistance, such as copper, whereas the coil lead layers 18 and 19 and the upper-core layer 15 are formed of a soft magnetic material, such as permalloy. The impedance of the path conducting a recording current flow in the coil layer 12 therefore depends on not only the resistivity of the coil layer 12 but also the resistivities of the coil lead layers 18 and 19 made of a soft magnetic material. The resistivity of the soft magnetic material used in the first and second coil lead layers 18 and 19, however, is higher than that of copper, and thus the impedance increases and noise will occur.

In order to increase the recording density of the magnetic signals on recording media, such as hard disks, the gap length G1 of the magnetic gap layer between the lower-core layer 8 and the upper-core layer 15 must be decreased and the frequency of the magnetic field induced into the lower-core layer 8 and the upper-core layer 15 through the coil layer 12 must be increased to several hundred hertz or more. Such high frequency magnetic recording requires improvement in soft magnetic characteristics of the lower-core layer 8 and the upper-core layer 15 and use of magnetic materials having high magnetic permeability, high saturation magnetic flux density, low coercive force and high resistivity. Conventional upper-core layers 15 composed of permalloy etc. have relatively low resistivity and thus cause large core loss due to eddy current loss during high frequency recording.

Upper-core layer 15 composed of soft magnetic materials having high resistivity have been proposed in order to achieve high frequency recording in thin film magnetic heads shown in FIGS. 3 and 4. In this case, however, the first coil lead layer 18 and the second coil lead layer 19 are formed of the same high resistivity material as the upper-core layer 15, and thus high frequency recording will generate noticeable noise due to increased impedance.

SUMMARY OF THE INVENTION

It is an object of the present invention to provide a combination read/write thin film magnetic head in which a coil lead layer conducting a recording current flow to a coil layer is formed of another conductive material having low resistivity different from a material for an upper-core layer in order to prevent an increase in impedance in high frequency recording.

It is another object of the present invention to provide a combination read/write thin film magnetic head in which an upper-core layer is formed of a magnetic material having excellent soft magnetic characteristics and high resistivity in order to improve high frequency recording characteristics.

It is a further object of the present invention to provide a combination read/write thin film magnetic head in which a coil lead layer can be formed without an increase in the total number of the layers of the head and the production steps.

In accordance with the present invention, a combination read/write thin film magnetic head comprises: a magnetoresistive element, a main lead layer leading a sensing current to the magnetoresistive element, a lower-core layer formed on the main lead layer through an insulating layer, an upper-core layer facing the lower-core layer through a magnetic gap at the section facing a recording medium, a coil layer inducing a magnetic field to both of the lower- and upper-core layers, and a coil extraction layer simultaneously formed of the same material in the same step as the main lead layer, wherein the coil extraction layer is connected to the wound center of the coil layer.

Preferably, an electrically conductive layer is formed between the coil extraction layer and the wound center of the coil layer with the same material in the same step as the lower-core layer.

A coil lead layer may be formed on the insulating layer with the same material in the same step as the coil layer, and the coil lead layer may be electrically connected to the coil extraction layer. Another coil lead layer may integrally protrude from the outer terminal of the coil layer.

The lower- and upper-core layers are preferably formed of a soft magnetic alloy comprising Fe as the major component, at least one element selected from the group consisting of rare earth metals, Ti, Zr, Hf, V, Nb, Ta and W, and O.

The lower- and upper-core layers are preferably formed of a soft magnetic alloy comprising Co as the major component, at least one element as a main component selected from the group consisting of Fe, Ni, Pd, Mn and Al, at least one element selected from the group consisting of rare earth metals, Ti, Zr, Hf, Nb, Ta, Mo, W and Y, and O.

In the present invention, the combination read/write thin film magnetic head has two recording current paths to the coil layer, i.e., a path from the first coil lead layer to the wound center of the coil layer through the coil extraction layer (and the electrically conductive layer), and another path from the second coil lead layer to the outer terminal of the coil layer. Since the first and second coil lead layers are formed of the same low-resistivity material as the coil layer, the coil extraction layer, the first and second coil lead layers, and the coil layer have low impedance.

The resistance of the electrically conductive layer is substantially negligible since the electrically conductive layer has an extremely small volume, although it is formed of the same high-resistivity magnetic material as the lower core layer.

Since the lower- and upper-core layers are formed of a material different from that of the coil lead layer, an appropriate soft magnetic material having high saturation magnetic flux density, low coercive force and high resistivity other than permalloy etc. can be used for the lower- and upper-core layers without increasing the impedance of the recording current paths, and high frequency recording characteristics of recording media improve.

The coil extraction layer and the main lead layer are formed by the same step, and the first and second coil lead layers and the coil layer are formed by the same steps. The coil extraction layer and the first and second coil lead layers can be formed without increasing the number of the layers along the vertical direction.

DESCRIPTION OF THE PREFERRED EMBODIMENTS

The present invention will now be described with reference to the drawings.

Figure 1:
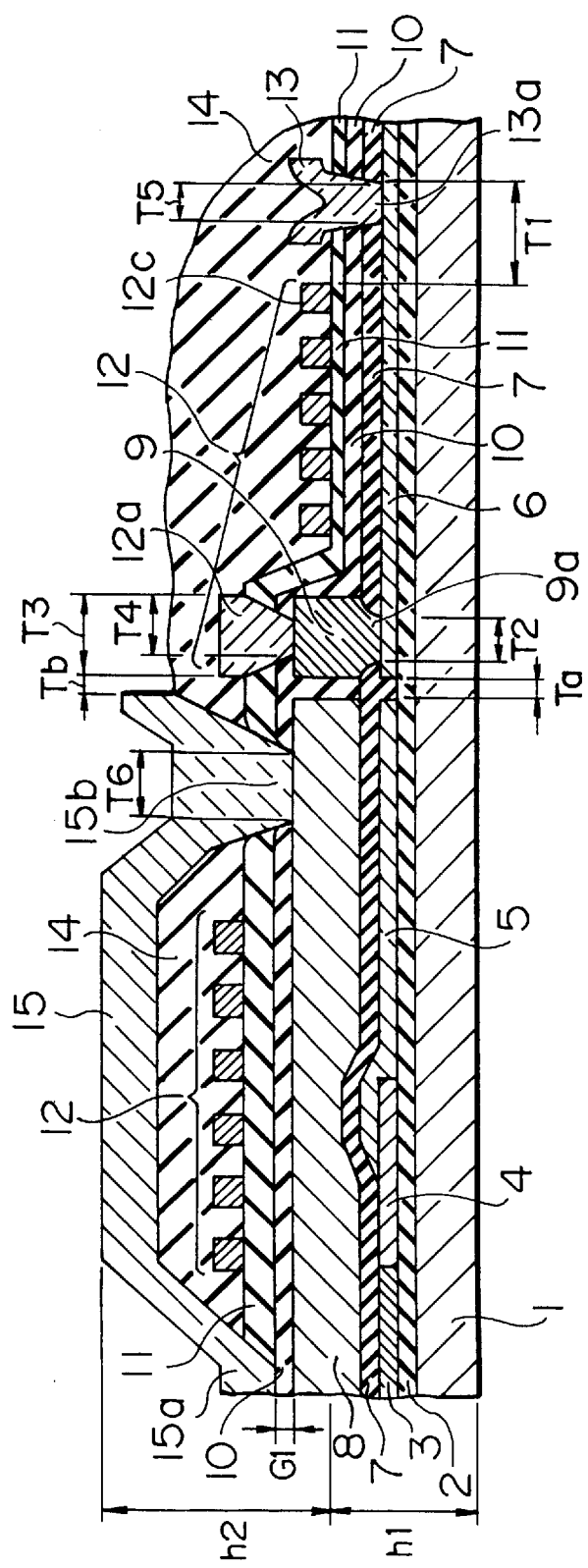
FIG. 1 is an enlarged cross-sectional view of a combination read/write thin film magnetic head in accordance with the present invention, and taken along sectional line I—I of FIG. 2.
Figure 2:
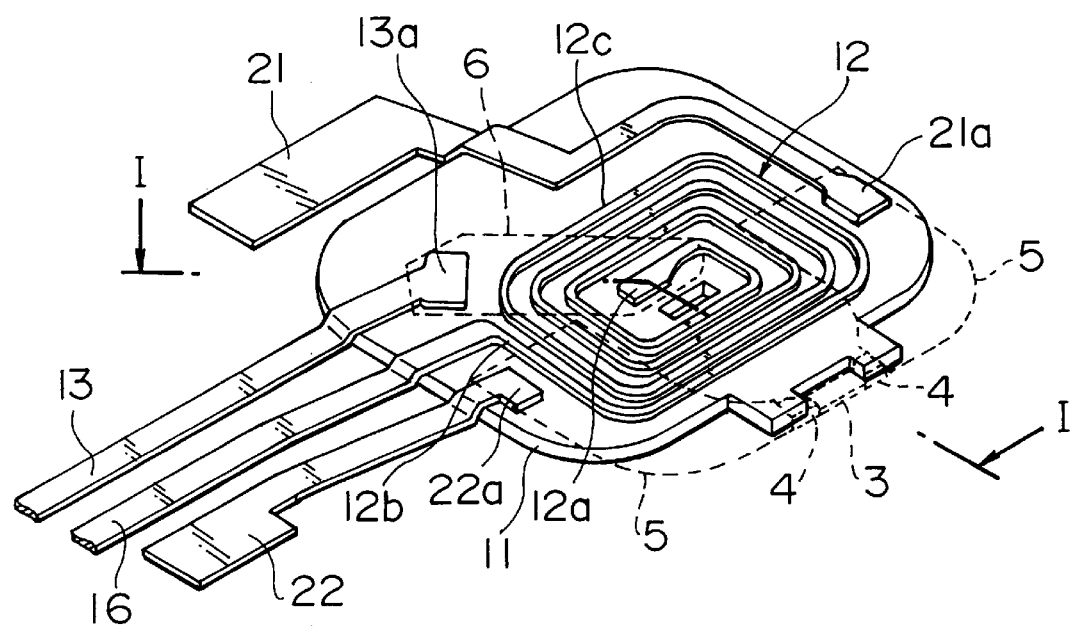
FIG. 2 is an isometric view of a combination read/write thin film magnetic head in accordance with the present invention before an insulating layer and an upper-core layer are formed.
Figure 3:
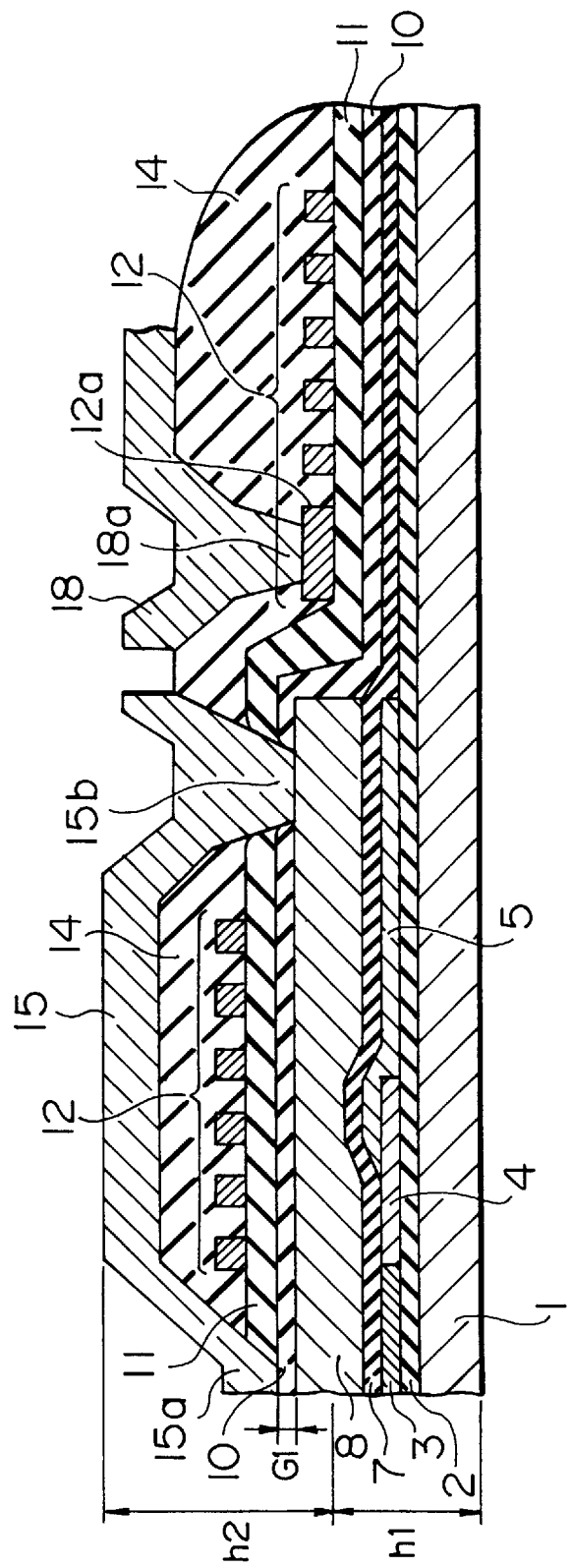
FIG. 3 is an enlarge cross-sectional view of a conventional thin film magnetic head.
Figure 4:
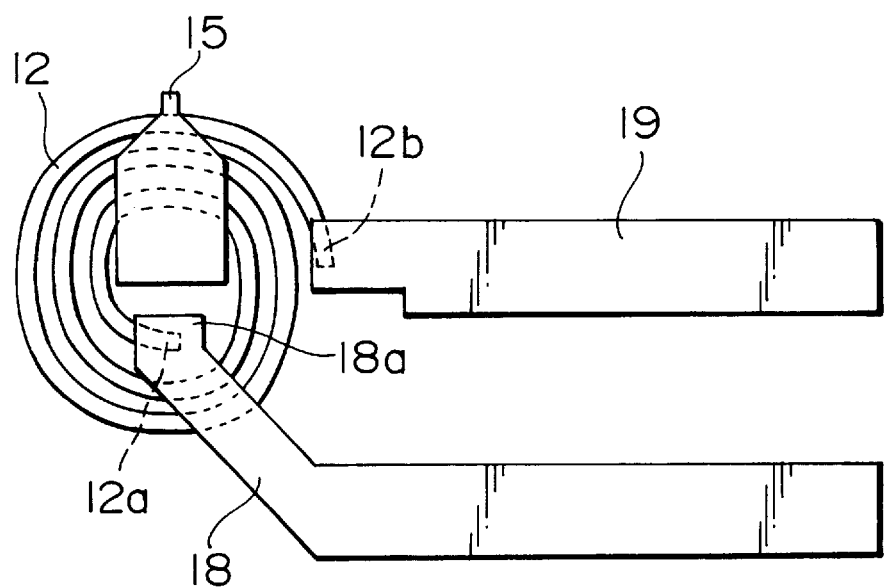
FIG. 4 is a fragmentary plan view illustrating a current flow path to a coil layer in a conventional thin film magnetic head.

FIG. 1 is a cross-sectional view of a combination read/write thin film magnetic head in accordance with the present invention, and FIG. 2 is an isometric view of the combination read/write thin film magnetic head before an insulating layer 14 and an upper-core layer 15 are formed. FIG. 1 is taken along sectional line I—I of FIG. 2.

The combination read/write thin film magnetic head is provided beside the trailing side face of a slider of a floating-type magnetic head assembled in hard disks and the like and comprises a reading head h1 which uses the magnetoresistance effect and a writing inductive head h2 deposited thereon. The reading head h1 includes from a lower-shielding layer 1 to a lower-core layer (upper-shielding layer) 8, and the writing inductive head h2 includes the layers above the lower-core layers 8.

The lower-shielding layer 1 formed of sendust (a Fe-Al-Si alloy) or permalloy is provided beside the trailing side face, and a lower-gap layer 2 formed of an insulating material such as aluminum oxide ($Al_2O_3$) is provided on the lower-shielding layer 1. A magnetoresistive element 3 is formed on the lower-gap layer 2. The magnetoresistive layer 3 includes the following three layers, i.e., a SAL (Ni-Fe-Nb alloy), a SHUNT layer of a nonmagnetic material (for example, tantalum) and a MR layer having magnetoresistance effects (Fe-Ni alloy). Hard bias layers 4, which conduct a longitudinal bias magnetic field to the magnetoresistive element 3, are formed so as to come in contact with both sides of the magnetoresistive element 3.

The hard bias layers 4 provided beside both sides of the magnetoresistive element 3 are provided with a main lead layer 5 which leads a sensing current to the magnetoresistive element 3. The main lead layer 5 is formed of a nonmagnetic electrically conductive material having low resistivity, such as tungsten (W), copper (Cu) or gold (Au).

A coil extraction layer 6 is provided on the lower-gap layer 2. The coil extraction layer 6 is composed of the same material as the main lead layer 5, and is simultaneously formed with the main lead layer 5 so as to separate from the main lead layer 5, based on the following steps.

A nonmagnetic electrically conductive material layer having low resistivity is deposited over the magnetoresistive element 3, hard bias layer 4 and lower-gap layer 2 by a sputtering process or an evaporation process. The nonmagnetic electrically conductive material layer other than the regions used as the main lead layer 5 and coil extraction layer 6 is removed by a wet-etching process or a dry-etching process. When wet- or dry-etching selectivity is not found between the materials for the magnetoresistive element 3 and hard bias layer 4 and the nonmagnetic electrically conductive material for the main lead layer 5, a resist layer is formed on regions other than the main lead layer 5 and the coil extraction layer 6, a nonmagnetic material having low electrical resistivity is deposited thereon by a low temperature sputtering process, e.g. AC, RF magnetron or ion beam sputtering process, and the resist layer is removed. Both of the main lead layer 5 and the coil extraction layer 6 therefore are formed of the same material by the same deposition process. The coil extraction layer 6 is formed such that the coil extraction layer 6 protrudes by a given length T1 relative to the outermost coil 12c of a coil layer 12 which will be formed later, and the main lead layer 5 and the coil extraction layer 6 are separated from each other by a gap Ta provided therebetween.

An upper-gap layer 7 composed of an insulating material (nonmagnetic material) such as aluminum oxide ($Al_2O_3$) is deposited to entirely cover the magnetoresistive element 3, the main lead layer 5 and the coil extraction layer 6 by a sputtering process or the like. After the upper-gap layer 6 is formed, a hole having a minimum width T2 is formed by an ion milling process or the like in order to conduct the lower end 9a of an electrically conductive layer 9 described below.

The lower-core layer 8 composed of a Fe-Ni alloy (permalloy) or a soft magnetic material having high resistivity is provided on the upper-gap layer 7. The lower-core layer 8 also acts as an upper-shielding layer of the reading head h1 which uses the magnetoresistance effect.

The electrically conductive layer 9 is provided behind the lower-core layer 8. The electrically conductive layer 9 is formed of the same material and by the same process as the lower-core layer 8. That is, the lower-core layer 8 is deposited by a plating or sputtering process, and a layer composed of the same magnetic material as the upper-gap layer 7 is simultaneously formed into the hole having the width T2 provided in the gap layer 7 such that the lower-core layer 8 and the electrically conductive layer 9 are separated from each other by a given gap Tb. The lower end 9a of the electrically conductive layer 9 is connected to the coil extraction layer 6. The electrically conductive layer 9 links the coil extraction layer 6 and the coil layer 12. It is preferable that the width T3 or cross-sectional area of the electrically conductive layer 9 be as large as possible in order to decrease the electrical resistance of the electrically conductive layer 9 which is formed of the same soft magnetic material having resistance as high as the lower-core layer 8.

Next, a gap layer 10 composed of a nonmagnetic material, e.g. aluminum oxide ($Al_2O_3$) or $SiO_2$, is formed on the electrically conductive layer 9 and the upper-gap layer 7 by a sputtering process. The gap layer 10 determines a gap length G1 between the lower-core layer 8 and the front end 15a of the upper-core layer 15 in the inductive head h2. An insulating layer 11 composed of an organic resinous material such as polyimide is formed on the gap layer 10. The gap layer 10 and the insulating layer 11 are removed by an ion milling process so that the minimum width is T4 above the electrically conductive layer 9. Further, the upper-gap layer 7, the gap layer 10 and the insulating layer 11 are removed by an ion milling process so that the minimum width is T5 above the coil extraction layer 6.

A coil layer 12 composed of a nonmagnetic electrically-conductive material having low resistivity, such as copper, is spirally formed on the insulating layer 11. The coil layer 12 is formed between resist patterns on the insulating layer 11 by a plating process, such that the wound center 12a of the coil layer 12 is connected to the electrically-conductive layer 9 through a hole having the width T4. As shown in FIG. 2, a second coil lead layer 16 and the coil layer 12 are simultaneously and integrally formed such that the second coil lead layer 16 is linked to the outer end 12b of the coil layer 12. The second coil lead layer 16 extends to the exterior of the coil layer 12.

A first coil layer 13 composed of the same low resistivity material, e.g. copper, as the coil layer 12 is also formed in the same step in which the coil layer 12 and the second coil lead layer 16 are plated. As shown in FIG. 1, the connection terminal 13a of the first coil lead layer 13 is connected to the coil extraction layer 6 through the hole having the width T5 passing through the upper-gap layer 7, gap layer 10 and insulating layer 11.

Electrode lead layers 21 and 22 are provided on the insulating layer as shown in FIG. 2. The electrode lead layers 21 and 22 are composed of the same nonmagnetic electrically conductive material, e.g. copper, by the same plating process as the coil layer 12, the second coil lead layer 16 and the first coil lead layer 13. The connecting terminals 21a and 22a of the electrode lead layers 21 and 22 are connected to the main lead layer 5 through the holes which are formed in the upper-gap layer 7, gap layer 10 and insulating layer 11 out of the region in which the lower-core layer 8 is formed.

Consequently, the coil layer 12, the first coil lead layer 13, the second coil lead layer 16 and the electrode lead layers 21 and 22 are simultaneously formed. In the step, resist patterns are formed on regions other than these layers on the insulating layer 11, and a nonmagnetic electrically conductive material, e.g. Cu, is plated between the patterns.

Next, the insulating layer 14 composed of an organic resinous material such as polyimide is formed thereon, and the upper-core layer 15 is deposited thereon using permalloy or a high resistivity material having excellent soft magnetic characteristics by a plating or sputtering process. The front end 15 of the upper-core layer 15 is connected to the gap layer 10 having a gap length G1 on the lower-core layer 8. A hole having a minimum width T6 is formed so as to pass through the gap layer 10, the insulating layer 11 and the insulating layer 14, so that the base end 15 of the upper-core layer 15 is magnetically connected to the lower-core layer 8 through the hole. A protective film (not shown in the drawings) composed of a nonmagnetic material, such as aluminum oxide ($Al_2O_3$), is formed on the upper-core layer 15.

The operation of the inductive head h2 will now be described.

Recording current flows from the first coil lead layer 13 to the wound center 12a of the coil layer 12 through the coil extraction layer 6 and the electrically conductive layer 9. Since the first coil lead layer 13 is formed of the same low resistivity material as the coil layer 12 and the coil extraction layer 6 is formed of the same low resistivity material as the main lead layer 5, the first coil lead layer 13 and the coil extraction layer 6 have low electrical resistance. The electrical resistance of the electrically conductive layer 9 is extremely low although the electrically-conductive layer 9 is formed of the same soft magnetic material having high resistivity as the lower-core layer 8, because the electrically conductive layer 9 has a significantly small size along the current flow. The second coil lead layer 16 also has low electrical resistance since the layer is composed of the same low resistivity material as the coil layer 12. As a result, the current flow path to the coil layer 12 has low impedance, resulting in noise reduction.

A current flow in the coil layer 12 induces a recording magnetic field in the lower-core layer 8 and the upper-core layer 15, and generate a leakage magnetic field from the lower-core layer 8 and the front end 15a of the upper-core layer 15 through the magnetic gap length G1 to record magnetic signal on a recording medium.

A soft magnetic material can be appropriately selected to form the lower-core layer 8 and the upper-core layer 15 in which a recording magnetic field is induced, regardless of the material for the current flow path. For example, both of the lower-core layer 8 and the upper-core layer 15 may be formed of a Fe-Ni alloy (permalloy) or a soft magnetic material having a higher resistivity than the permalloy. The lower-core layer 8 and the upper-core layer 15 formed of a soft magnetic material having high resistivity can decrease eddy current loss of the recording magnetic field of high frequency and can improve high frequency characteristics.

Examples of soft magnetic materials having higher saturation magnetic flux densities and lower coercive forces than the permalloy include the following materials.

(1) Soft magnetic materials represented by the composition formula $Fe_aM_bO_c$ wherein suffixes a, b and c by atomic percent satisfy the following equations:

$$50 \leq a \leq 70,$$

$$5 \leq b \leq 30,$$

$$10 \leq c \leq 30, \text{ and}$$

$$a+b+c=100$$

In the composition formula, Fe represents the major component having magnetic characteristics, and M represents one or two elements among rare earth elements or at least one element among Groups 4A, 5A and 6A elements in the periodic table. Since these elements react with oxygen to form oxides, the resistivity of the material can be controlled by the oxide contents. The material is preferably composed of 50% or less by volume (or surface or cross-sectional area) of a Fe fine crystalline phase having a bbc structure and an amorphous phase containing large amounts of M element(s) and oxygen.

(2) Soft magnetic materials represented by the composition formula $(Co_{1-c}T_c)_xM_yQ_zX_wY_s$ wherein suffix c satisfies $$0.05 \leq c \leq 0.5, \text{ and}$$

suffixes y, z, w and s by atomic percent satisfy the following equations;

$$3 \leq y \leq 30,$$

$$7 \leq z \leq 40,$$

$$0 \leq w \leq 20, \text{ and}$$

$$0 \leq s \leq 20$$

T is composed of at least one element selected from Fe, Ni, Pb, Mn and Al, and T and Co (cobalt) are major components in the material. M is composed of at least one element selected from Ti, Zr, Hf, Nb, Ta, Mo and W and at least one element among rare earth elements. Q is composed of at least one element selected from O, C and B. X is composed of Si and/or Cr. Y is composed of at least one element selected from Au, Ag and platinum metals. The material is preferably composed of a bcc fine crystalline phase containing Co as a major component, a bcc fine crystalline phase containing Fe as a major component, and an amorphous phase containing large amounts of M element(s) and oxygen, in which the content of the fine crystalline phases is 50% or less by volume (or surface or cross-sectional area).

During the reading operation of the reading head h1, a sensing current is conducted to the magnetoresistive element 3 from the electrode lead layers 21 and 22 through the main lead layer 5 and a leakage magnetic field from a recording medium such as a hard disk is detected by means of magnetoresistance effects of the magnetoresistive element 3.

The first coil lead layer 13, the second coil lead layer 16 and the electrode lead layers 21 and 22 can be simultaneously formed in the step for forming the coil layer 12, the coil extract layer 6 and the main lead layer 5 can be simultaneously formed by a single step, and the electrically conductive layer 9 and the lower-core layer 8 can be simultaneously formed by another single step. The head therefore can be produced by simplified steps and has a simplified vertical layer configuration.

In FIG. 1, the coil extraction layer 6 is connected to the coil layer 12 through the electrically conductive layer 9. The electrically conductive layer 9 may be another conductive material different from that for the lower-core layer 8, or the coil extraction layer 6 may be directly connected to the coil layer 12 without providing the electrically conductive layer 9.

In the reading head h1, the upper-gap layer 7 may be deposited on the lower-gap layer 2 in the region other than the magnetoresistive element 3 and the main lead layer 5 and the coil extraction layer 6 may be formed thereon. In this case, an insulating layer composed of an organic or inorganic material is formed on the main lead layer 5 and the coil extraction layer 6, and the lower core layer 8 and the electrically conductive layer 9 are formed on the insulating layer so that the electrically conductive layer 9 is connected to the coil extraction layer 9 through the hole formed in the insulating layer.

The combination read/write thin film magnetic head in accordance with the present invention has a recording current path, composed of a coil extraction layer and a coil lead layer, to the coil layer, and is characterized as follows:

(A) Since the coil extraction layer is formed of the same low-resistivity material as the main lead layer and the coil lead layer is formed of the same low-resistivity material as the coil layer, impedance of the coil layer including the current flow path can be reduced.

(B) The recording current path to the coil layer and the lower- and upper-core layers can be formed of different materials. The lower- and upper-core layers therefore can be formed of a soft magnetic material having high resistivity, and eddy current loss can be reduced in high frequency recording, resulting in improvement in recording characteristics.

(C) Since the coil extraction layer and the main lead layer can be simultaneously formed, and the coil lead layer and the coil layer can be simultaneously formed, additional manufacturing steps for the coil extraction layer and the coil lead layer are not necessary.

What is claimed is:

1. A combination read/write thin film magnetic head comprising:

a magnetoresistive element, a main lead layer leading a sensing current to said magnetoresistive element, a lower-core layer formed on said main lead layer through an insulating layer, an upper-core layer facing said lower-core layer through a magnetic gap at the section facing a recording medium, a coil layer inducing a magnetic field to both of said lower- and upper-core layers, and a coil extraction layer simultaneously formed of the same material in the same step as said main lead layer, wherein said coil extraction layer is connected to the wound center of said coil layer.

2. A combination read/write thin film magnetic head in accordance with claim 1, wherein an electrically conductive layer is formed between said coil extraction layer and said wound center of said coil layer with the same material in the same step as said lower-core layer.

3. A combination read/write thin film magnetic head in accordance with claim 1, wherein a coil lead layer is formed on said insulating layer with the same material in the same step as said coil layer, and said coil lead layer is electrically connected to said coil extraction layer.

4. A combination read/write thin film magnetic head in accordance with claim 1, wherein another coil lead layer integrally protrudes from the outer terminal of said coil layer.

5. A combination read/write thin film magnetic head in accordance with claim 1, wherein said lower- and upper-core layers are formed of a soft magnetic alloy comprising Fe as the major component; at least one element selected from the group consisting of rare earth metals, Ti, Zr, Hf, V, Nb, Ta and W; and O.

6. A combination read/write thin film magnetic head in accordance with claim 1, wherein said lower- and upper-core layers are formed of a soft magnetic alloy comprising Co as the major component; at least one element as a main component selected from the group consisting of Fe, Ni, Pd, Mn and Al; at least one element selected from the group consisting of rare earth metals, Ti, Zr, Hf, Nb, Ta, Mo, W and Y; and O.

* * * * *